Patented Feb. 5, 1935

1,989,788

UNITED STATES PATENT OFFICE 1,989,788

METHOD OF COMPOUNDING RUBBER

William S. Calcott and William A. Douglass, Pennsgrove, N. J., assignors to E. I. du Pont de Nemours & Company, Wilmington, Del., a corporation of Delaware No Drawing. Application June 27, 1929, Serial No. 374,270

8 Claims. (Cl. 18—50)

This invention relates to a method of treating rubber and the resulting rubber product and is more particularly concerned with a method of treatment whereby a rubber product is obtained which is unusually resistant to deterioration and oxidation.

It is generally accepted that the rate of deterioration of rubber articles differs greatly depending on various factors such as the composition of the stock, the form of the article and the conditions under which it is used. Various materials have heretofore been incorporated in rubber stocks to inhibit deterioration. However, most of the agents heretofore employed for this purpose have been open to the objection that they discolor the rubber. For some purposes, such as white and light colored stocks it is essential that the rubber composition contain nothing which will cause discoloration of the cured stock even after exposure to direct sunlight.

The use of certain phenolic compounds to retard the deterioration of rubber has been suggested as, for example, in British Patents #181,365 and #142,083. In general, however, the phenolic compounds mentioned have a very great retarding effect upon vulcanization when the vulcanization is carried out in a press. For example, Pelizzola (Giorn. Chem. Ind. Applicata 6, (1924) 59–60) found that the addition of 1 part of pyrogallol to a mixture of 100 parts of rubber and 8 parts of sulfur increased the time required for vulcanization from 2 hours to 4 hours at 144° C. We have found that phenol, resorcinol, and hydroquinone also exert this effect of retarding the vulcanization with certain accelerators so that their use is not always practical.

The primary object of this invention therefore is to provide a method for retarding the deterioration of rubber by the use of materials which cause practically no subsequent discoloration by exposure to direct sunlight and which at the same time do not retard the cure.

With this object in view it has now been discovered that compounds having the general formula HO—R—alkylidene—R'—Y wherein R and R' represent arylene or alkyl arylene hydrocarbon radicals, the arylene nuclei of which are directly connected by a single bond through an alkyl group or a substituted alkyl group, and Y represents H or OH, may be added a rubber mix without affecting the rate of cure and that the resulting rubber when vulcanized has much greater resistance to deterioration than rubber containing no antioxidant. In addition, these materials cause no substantial discoloration in the rubber even upon exposure to direct sunlight.

In order to disclose the invention in detail, the following examples of actual embodiments thereof are presented. It should be understood however that these examples are furnished purely for purposes of illustration and that it is not the intention that the invention be limited to the particular reagents, proportions or other conditions therein specified.

Example 1

As an example of the compounds comprising this invention, p-hydroxy-diphenyl methane

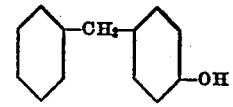

may be cited as one in which R and R' are the same aryl hydrocarbon radicals, the aryl nuclei are connected through an alkyl group and Y is hydrogen in the general formula given above.

Two stocks were made up of the following composition; the proportions given are by weight:

|  | Stock A | Stock B |
|---|---|---|
| Smoked sheets | 100 | 100 |
| Sulfur | 2 | 2 |
| Titanox | 50 | 50 |
| ZnO | 50 | 50 |
| Tetra-methyl-thiuram-monosulfide | 3 | 3 |
| p-hydroxy-diphenyl-methane | 0.2 | 0.2 |
|  |  | 1.0 |

The two stocks were cured at 20 lbs. steam pressure for 20 minutes. The cured samples were thereupon aged in an oxygen bomb at 70° C. under 300 lbs. of oxygen pressure. The time required for complete deterioration of the two stocks is indicated below.

|  | Days |
|---|---|
| For stock A | 7 |
| For stock B | 14 |

It will be noted that the resistance to deterioration of the stock containing the antioxidant was 100% greater than that of the stock containing no antioxidant.

Example 2

The effectiveness of para-hydroxy-diphenyl-methane in retarding deterioration was also shown by the following test. Two stocks were made up of the following composition in which the proportions are given by weight.

|  | Stock A | Stock B |
|---|---|---|
| Pale crepe | 100 | 100 |
| Titanox | 50 | 50 |
| Sulfur | 2.75 | 2.75 |
| ZnO | 5.0 | 5.0 |
| Di-o-tolylguanidine | 0.6 | 0.6 |
| p-hydroxy-diphenyl-methane | 0.0 | 1.0 |

The two stocks were cured for 20, 30 and 40 minutes at 40 lbs. steam pressure. The cured stocks were thereupon aged in an oxygen bomb at 70° C. and under 300 lbs. oxygen pressure.

The time required for complete deterioration of the different cures of the two stocks is indicated below.

|  | Days |
|---|---|
| For stock A (all cures) | 2 |
| For stock B (all cures) | 8 |

It will be noted that the resistance to deterioration of the stock containing the antioxidant is 300% greater than that of the stock containing no antioxidant.

The amount of discoloration was determined by exposure to the fadeometer, sun under glass, and directly to the sun. The presence of para-hydroxy-diphenyl-methane caused no greater discoloration than that observed in the control.

Among other compounds of the type where Y is H and R and R' are phenyl groups may be mentioned:

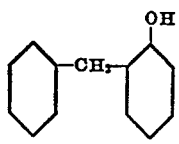

o-hydroxy-diphenyl- methane.

Example 3

As an illustration of the compounds in which R and R' are aryl nuclei, connected through an alkyl substituted alkyl group, and Y is OH in the general formula given above, p-p'-dihydroxy-diphenyl-methyl-methane

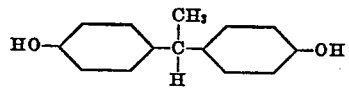

may be given as an example.

Two stocks were made up of the same composition as given in Example 1, stock A contained no antioxidant and stock B contained 1 part of para-para' - dihydroxy - diphenyl - methyl - methane. After curing the two stocks at 20 lbs. steam pressure for 20 minutes, the cured samples were aged in an oxygen bomb at 70° C. and under 300 lbs. oxygen pressure. The time required for complete deterioration is indicated below.

|  | Days |
|---|---|
| For stock A | 6 |
| For stock B | 15 |

It will be observed that the stock containing p-p'-dihydroxy-diphenyl-methyl-methane resisted deterioration 150% longer than the control stock.

Example 4

As an example of another compound of this type giving even better results may be mentioned p-p'-dihydroxy-diphenyl-methane:

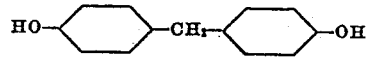

p-p'-dihydroxy-diphenyl-methane.

Two stocks were made up of the following composition; the proportions given are by weight:

|  | Stock A | Stock B |
|---|---|---|
| Smoked sheets | 100 | 100 |
| Sulfur | 2 | 2 |
| Titanox | 50 | 50 |
| ZnO | 3 | 3 |
| Tetra-methyl-thiuram-monosulfide | 0.2 | 0.2 |
| p-p'-dihydroxy-diphenyl-methane |  | 1.0 |

("Titanox" in the above formula, as well as in Examples 1 and 2, indicates a pigment containing 75% barium sulfate and 25% titanium oxide.)

The two stocks were cured at 20 lbs. steam pressure for 20 minutes. The cured samples were thereupon aged in an oxygen bomb at 70° C. under 300 lbs. of oxygen pressure. The time required for complete deterioration of the two stocks is indicated below.

|  | Days |
|---|---|
| For stock A | 7 |
| For stock B | 18 |

It will be noted that the resistance to deterioration of the stock containing the antioxidant was 160% greater than that of the stock containing no antioxidant.

Among other members of the new group of antioxidants in which Y is OH, the following compounds have been tested and found to have antioxidant properties comparable to those of p-hydroxy-diphenyl-methane.

1. 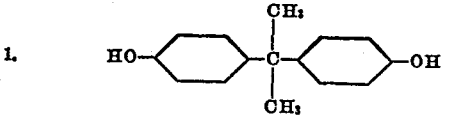

p-p'-dihydroxy-diphenyl-dimethyl-methane.

2. 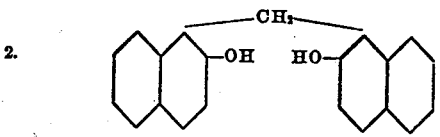

di-2-naphthol methane.

3. 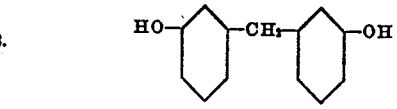

3-3'-dihydroxy-diphenyl-methane.

4. 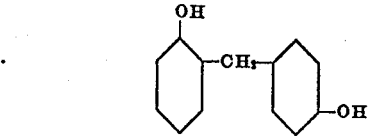

2-4'-dihydroxy-diphenyl-methane.

Example 5

As an example of the compounds comprising the invention, meta-meta'-dihydroxy-triphenyl-methane

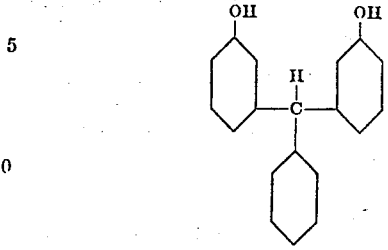

may be cited as one in which R and R' are aryl nuclei, connected together through an aryl substituted alkyl group, and Y is OH in the general formula given above.

Two stocks were made up of the same composition, cured, and aged as given in Example 1; stock A contained no antioxidant and stock B 1 part of m-m'-dihydroxy-triphenyl-methane. The time required for complete deterioration was as follows

| | Days |
|---|---|
| For stock A | 9 |
| For stock B | 24 |

It will be observed that the stock containing m-m'-dihydroxy-triphenyl-methane resisted deterioration 170% longer than the stock containing no antioxidant. Exposure to the fadeometer, sun under glass, and direct sun showed no greater discoloration of stock B than that of stock A.

Example 6

The orientation of the hydroxy groups in hydroxy derivatives of triphenyl methane has a marked effect on the discoloration caused by heat and particularly by sunlight.

Two stocks were made up, cured and aged as given in Example 1, stock A containing no antioxidant and stock B contained 1 part of sym. tri-para-hydroxy-triphenyl-methane,

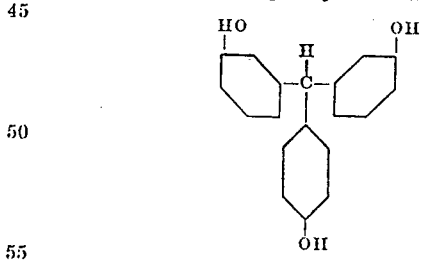

The stock containing no antioxidant was completely deteriorated in half the time of the stock containing the antioxidant. Upon exposure of the stocks to the fadeometer and to sunlight, stock B was markedly discolored. Although tri-para-hydroxy-triphenyl-methane shows a marked effect in retarding the deterioration of rubber, it is not suitable for use in light colored or white stocks because of the discoloration caused by light.

In some cases, it is advantageous to treat vulcanized rubber with reagents to improve the aging characteristics. The group of compounds described above is particularly useful for this purpose. In general, the antioxidant is dissolved in a solvent and the cured stock is then immersed in the solution. After sufficient time has elapsed to permit the desired degree of absorption, the solvent is removed, for example, in an evacuated desiccator. An example of this modification of the process follows.

Example 7

A solution was made by dissolving 1 part by weight of di-2-naphthol-methane in a mixture of 1.6 parts by weight of ethyl alcohol and 13 parts of benzene. The resulting solution therefore contains 6.4 parts by weight of the antioxidant.

Vulcanized rubber was prepared by curing a stock having the following composition:

| | |
|---|---|
| Smoked sheets | 100 |
| ZnO | 18.15 |
| Sulfur | 2.75 |
| Di-o-tolylguanidine | 0.5625 | for 40 minutes at 40 lbs. steam pressure. This stock was cut into strips one of which was immersed in the antioxidant solution for 30 minutes. The solvent was then removed in an evacuated desiccator. For purposes of comparison another strip was immersed for the same length of time in ordinary commercial benzene and still another strip was untreated.

The three samples of rubber were then aged in an oxygen bomb at 70° C. under 300 lbs. oxygen pressure. The time required for complete deterioration is given below:

| | Days |
|---|---|
| Control untreated | 6 |
| Benzene treated | 7 |
| Antioxidant treated | 25 |

It will be noted that the resistance to deterioration of the stocks treated with the solution of the antioxidant is more than 200% greater than that of the untreated stocks.

Many other compounds falling within the general class described herein could be named. The particular compounds are mentioned above merely by way of example. As indicated already, the alkyl group common to both R and R' may contain more than one carbon atom and may contain either an alkyl or aryl group. Also, it is obvious that compounds of the type described may contain alkyl substituents which groups would have very little effect upon the properties of the particular compound.

Compounds in which one of the aryl groups is a phenyl group and one a naphthyl group may likewise be employed, and in such compounds the OH group may be attached to the naphthyl nucleus. As examples of such compounds, the benzyl naphthols may be mentioned, for instance, 1-benzyl-2-naphthol.

The antioxidants may be incorporated into the unvulcanized rubber by any well known means, such as by milling them into the stock upon the rolls of an ordinary mill. Moreover, they may be employed with various compounding ingredients and in various rubber compounds and rubber substitutes such as, for example, gutta-percha, balata and synthetic rubber and it is therefore to be understood that the invention is not limited to any particular rubber stock or rubber compound. Also, the proportions of the antioxidant employed may be varied within wide limits although under ordinary circumstances about 1% of the antioxidant based on the weight of the stock treated has been found to be highly satisfactory.

As many apparent and widely different embodiments of this invention may be made without departing from the spirit thereof, it is to be understood that we do not limit ourselves to the foregoing examples or description except as indicated in the following claims:

We claim:

1. The process of increasing the resistance of rubber to deterioration due to aging, which comprises incorporating with the rubber a mono-hydroxy-diaryl methane.

2. The process of increasing the resistance of rubber to deterioration due to aging, which comprises incorporating with the rubber a mono-hydroxy-aryl-phenyl methane.

3. The process of increasing the resistance of rubber to deterioration due to aging, which comprises incorporating with the rubber a mono-hydroxyl-diphenyl methane.

4. The process of increasing the resistance of rubber to deterioration due to aging, which comprises incorporating with the rubber a benzyl naphthol.

5. Rubber having incorporated therewith a mono-hydroxy-diaryl methane.

6. Rubber having incorporated therewith a mono-hydroxy-aryl-phenyl methane.

7. Rubber having incorporated therewith a mono-hydroxy-diphenyl methane.

8. Rubber having incorporated therewith a benzyl naphthol.

WILLIAM S. CALCOTT.
WILLIAM A. DOUGLASS.

CERTIFICATE OF CORRECTION.

Patent No. 1,989,788.      February 5, 1935.

WILLIAM S. CALCOTT, ET AL.

It is hereby certified that error appears in the printed specification of the above numbered patent requiring correction as follows: Page 3, column 2, after line 55, insert the following paragraph:

The term 'aryl' as used herein is defined as a univalent aromatic hydrocarbon radical, such as phenyl, naphthyl, or alkyl substituted phenyl or naphthyl, whose free valence belongs to the nucleus and not to a side chain.

And that the said Letters Patent should be read with this correction therein that the same may conform to the record of the case in the Patent Office.

Signed and sealed this 21st day of May, A. D. 1935.

Leslie Frazer (Seal)      Acting Commissioner of Patents.